3,432,460
ANTIOZONANTS
Ronald B. Spacht, Hudson, Ohio, assignor to The Goodyear Tire & Rubber Company, Akron, Ohio, a corporation of Ohio
No Drawing. Continuation of application Ser. No. 468,118, June 29, 1965. This application Feb. 19, 1968, Ser. No. 706,712
U.S. Cl. 260—45.9     12 Claims
Int. Cl. C08c 11/46

ABSTRACT OF THE DISCLOSURE

Low melting mixtures of ring alkylated diphenyl-para-phenylene diamines and their use in the stabilization of polymers.

---

This application is a continuation of application Ser. No. 468,118 filed June 29, 1965, now abandoned, which is a continuation-in-part of application Ser. No. 116,674 filed June 13, 1961, now abandoned, which was a continuation-in-part of application Ser. No. 844,626 filed Oct. 6, 1959, now abandoned.

This invention relates to stabilizers for rubbers and is particularly concerned with the use of ring alkylated tend to ultimately volatilize from the rubber and thus oxidizable diene rubbers.

The deleterious effect of ozone on stretched rubber articles has been known for a long time. However, the problem has become considerably worse with the advent of concentrated industrialization, high speed travel, and various other factors which affect the aging properties of rubber articles. With the advent of synthetic rubber polymers, e.g. styrene-butadiene rubbers, and their widespread use, the ozone problem has become particularly acute because such synthetic rubber polymers have proved to be very susceptible to ozone attack. In connection with this problem, antiozonants must remain in the rubber during the useful life of the rubber in order to provide satisfactory rubber articles. Many antiozonants and antioxidants are capable of protecting various rubbers for various periods of time but most of them tend to ultimately volatilize from the rubber and thus leave the rubber open to attack by the ozone.

Often antiozonants may prove to be effective in laboratory testing but ineffective in actual service because of the volatility of the composition. Antiozonants may have reduced effectiveness because of attack by oxygen. Antiozonants vary greatly in their resistance to attack by oxygen. In general, the diaryl-para-phenylenediamines, in accordance with the present invention, are much more resistant to attack by oxygen than the alkyl-aryl or dialkyl-para-phenylenediamines. Many phenolic compositions and amine compositions have been used as antioxidants for rubber for a considerable period of time but most of these materials are not effective as antiozonants. Diaryl-para-phenylenediamines have also been used as antiozonants and antioxidants for rubber. However, compounds of this class are in general solids which completely melt at temperatures in the neighborhood of 100° C. or higher and which have only limited solubility in aqueous mediums and aliphatic hydrocarbons, and particularly rubber. They are thus quite difficult to incorporate in rubber without employing comparatively high temperatures, aromatic solvents, or vigorous milling action. Particular difficulties have been encountered in incorporating high melting diaryl-para-phenylenediamines in latices and raw polymers.

It is an object of this invention to provide compositions which are improved stabilizers and antioxonants for oxidizable diene rubbers. It is another object of this invention to provide ring alkylated diphenyl-para-phenylenediamines which have increased solubility in rubber and organic solvents used in the preparation of various synthetic rubbers. It is a further object of this invention to provide alkylated diphenyl-para-phenylenediamines having low melting points, which therefore emulsify easily, thus greatly facilitating their incorporation in rubber latices.

This invention is concerned with protecting oxidizable diene rubber by adding thereto in an antiozonant amount a mixture of low melting alkyl-substituted diphenyl-para-phenylenediamines. More specifically, the invention is directed to mixed alkyl substituted diphenyl-para-phenylenediamines melting below 80° C. Compounds of the present invention conform to the following general formula:

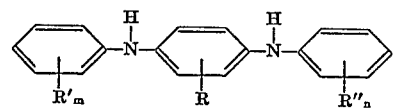

wherein R may be selected from the group consisting of hydrogen and alkyl radicals having from 1 to 10 carbon atoms and wherein R' and R" are selected from alkyl radicals having from 1 to 12 carbon atoms and wherein the sum of carbon atoms in R' and R" is from 3 to 24 and wherein m and n are integers ranging from 0 to 3 and wherein the sum of m and n range from 1 to 4.

The low melting alkylated diphenyl-paraphenylenediamines which are to be employed in the practice of this invention may be prepared by reacting in the presence of a condensation catalyst, one mol of hydroquinone or ring alkylated hydroquinone with from 2.0 to 2.5 mols of one of the following amine mixtures:

(1) 2.0 to 2.5 mols of mixed xylidines
(2) 1.0 to 1.25 mols mixed toluidines and 1.0 to 1.25 mols mixed xylidines
(3) 1.0 to 1.25 mols 2,4-dimethyl aniline and 1.0 to 1.25 mols ortho-toluidine
(4) 1.0 to 1.25 mols mixed toluidines, 0.7 to 1.0 mol of mixed xylidines and 0.1 to 0.5 mol of aniline
(5) 1.0 to 1.25 mols of mixed xylidines and 1.0 to 1.25 mols of ortho-ethyl aniline
(6) 1.0 to 1.25 mols of ortho-ethyl aniline and 1.0 to 1.25 mols of aniline
(7) 1.0 to 1.25 mols of ortho-toluidine and 1.0 to 1.25 mols ortho-ethyl aniline
(8) 2.0 to 2.5 mols of dodecyl aniline
(9) 1.0 to 1.25 mols of mixed toluidines and 1.0 to 1.25 mols of amyl aniline
(10) 1.0 to 1.25 mols of mixed toluidines and 1.0 to 1.25 mols of dodecyl aniline

(11) 1.0 to 1.25 mols of mixed toluidines, 0.5 to 0.625 mol of aniline and 0.5 to 0.625 mol of mixed xylidines
(12) 1.0 to 1.25 mols of mixed toluidines, 0.5 to 0.625 mol of aniline and 0.5 to 0.625 mol of 2,6-diethyl aniline
(13) 1.0 to 1.25 mols of mixed toluidines and 1.0 to 1.25 mols of ortho-ethyl aniline
(14) 1.0 to 1.25 mols of mixed toluidines, 0.5 to 0.625 mol of 2,6-diethyl aniline and 0.5 to 0.625 mol of ortho-ethyl aniline
(15) 1.0 to 1.25 mols of mixed toluidines, 0.5 to 0.625 mol of amyl aniline and 0.5 to 0.625 mol or ortho-ethyl aniline
(16) 1.0 to 1.25 mols of mixed xylidines and 1.0 to 1.25 mols of aniline
(17) 1.0 to 1.25 mols of aniline and 0.5 to 0.625 mol of 2,6-diethyl aniline and 0.5 to 0.625 mol of ortho-ethyl aniline
(18) 1.0 to 1.25 mols of mixed cumidines and 1.0 to 1.25 mols of mixed toluidines
(19) 2.0 to 2.5 mols of mixed cumidines.

Of the foregoing amine mixtures which may be reacted per mol of hydroquinone, 2.0 to 2.5 mols of mixed xylidines, 1.0 to 1.25 mols of mixed toluidines and 1.0 to 1.25 mols of mixed xylidines, and 2.0 to 2.5 mols of mixed cumidines represent preferred mixtures. To facilitate the removal of water of condensation formed by the reaction of any of the foregoing amine mixtures with hydroquinones a small amount of an aromatic hydrocarbon or an aliphaitc hydrocarbon boiling from 60 to 150° C. may be employed as an azeotrope. Preferred azeotropic solvents are the aromatic hydrocarbons such as benzene, toluene and xylene.

Low melting alkylated diphenyl-para-phenylenediamines may also be prepared by reacting para aminophenols with any of the amine mixtures listed above providing the proportions of amines in the mixtures are doubled so that a total of from 4 to 5 mols of the amine mixture are used per mol of para aminophenol Because the diaryl - phenylenediamines disclosed by the prior art as rubber stabilizers are relatively high melting solids having very limited solubility in aqueous mediums and in aliphatic organic solvents and rubber they are quite difficult to incorporate into rubber latices. In contrast, the low melting alkyl substituted diphenyl-para-phenylenediamines of this invention are much more soluble in the various solvents and rubber. Many of the mixed diphenyl-para-phenylenediamines are sticky solids at room temperature. In order to determine their melting point, between 5 and 100 grams of the compound were placed in a circulating air oven at 40° C. The temperature was raised 5° C. each 24 hour period. The melting point of these compounds was recorded to the nearest 5° C. The recorded melting point was the temperature at which the last trace of solid disappeared from the sample. In most cases this temperature was considerably higher than the temperature at which the product first became fluid.

The low melting compounds of this invention are surprisingly soluble in aliphatic hydrocarbons. The solubility of the various compounds was determined by placing a small excess of the materials beyond that which will readily dissolve at 25° C. in 100 milliliters of an aliphatic hydrocarbon and rolling the sample for 24 hours. The sample was then allowed to settle and 10 milliliters of the saturated solution was removed and evaporated to dryness. The residue in the 10 milliliter aliquot was weighed and the solubility of the compound per milliliter of solution was determined.

The following table presents data showing the melting points and the solubility in normal pentane of typical low melting alkylated diphenyl-para-phenylenediamines of this invention prepared by reacting hydroquinone with the amine mixtures indicated in the left hand column.

TABLE I

| Amine Mixtures | Mols of amine mixture per mol of hydroquinone | Properties of resulting alkyl substituted diphenyl-para-phenylene-diamines | |
|---|---|---|---|
| | | Melting Point, ° C. | Solubility in n-pentane in grams per ml. |
| Mixed xylidines | 2.2 | 46 | 0.035 |
| Mixed toluidines, mixed xylidines | 1.1:1.1 | (¹) | 0.031 |
| 2,4-dimethyl aniline, ortho-toluidine | 1.1:1.1 | 67–70 | |
| Mixed toluidines, mixed xylidines, aniline | 1.1:1.0:0.1 | 60 | 0.027 |
| Do | 1.1:0.9:0.2 | 60 | 0.025 |
| Do | 1.1:0.8:0.3 | 65 | 0.023 |
| Do | 1.1:0.7:0.4 | 70 | 0.013 |
| Mixed toluidines, aniline, mixed xylidines | 1.1:0.55:0.55 | 75 | |
| Mixed xylidines, ortho-ethyl aniline | 1.1:1.1 | 56 | 0.04 |
| Ortho-ethyl aniline, aniline | 1.1:1.1 | 56 | |
| Ortho-toluidine, ortho-ethyl aniline | 1.1:1.1 | 75 | 0.0087 |
| Dodecyl anilines | 2.2 | 42 | >0.12 |
| Mixed toluidines, amyl anilines | 1.1:1.1 | 65 | 0.027 |
| Mixed toluidines, dodecyl anilines | 1.1:1.1 | 52 | 0.047 |
| Mixed totuidines, amyl aniline, 2,6-diethyl aniline | 1.1:0.55:0.55 | 65 | 0.026 |
| Mixed toluidines, ortho-ethyl aniline | 1.1:1.1 | 65 | |
| Mixed toluidines, 2,6-diethyl aniline, ortho-ethyl aniline | 1.1:0.55:0.55 | 65 | |
| Mixed toluidines, amyl aniline, ortho-ethyl aniline | 1.1:0.55:0.55 | 58 | |
| Mixed xylidines and aniline | 1.1:1.1 | 70 | 0.013 |
| Aniline, 2,6-diethyl aniline, ortho-ethyl aniline | 1.1:0.55:0.55 | 70 | 0.0099 |
| Mixed cumidines, mixed toluidines | 1.25:1.25 | 65 | 0.028 |
| Mixed cumidines | 2.2 | (²) | |

¹ 60 or below. ² Liquid 40°.

The unpredictability of the melting point and solubility of mixed alkylated diphenyl-para-phenylenediamines is demonstrated by the data presented in Table II below wherein the melting points and solubility values are obtained in the same manner as discussed for Table I above. The compounds shown in the following table were prepared by reacting hydroquinone with the amine mixtures indicated in the left hand column.

TABLE II

| Amine Mixtures | Mols of amine mixture per mol of hydroquinone | Properties of resulting alkyl substituted diphenyl-para-phenylene-diamines | |
|---|---|---|---|
| | | Melting Point, ° C. | Solubility in n-pentane in grams per ml. |
| Mixed toluidines | 2.2 | 92–110 | 0.0033 |
| Aniline, mixed toluidines | 1.1:1.1 | 98–112 | 0.0035 |
| Aniline, meta-toluidine | 1.1:1.1 | 93–98 | |
| Aniline, ortho-toluidine | 1.1:1.1 | 90–105 | 0.0025 |
| Para-anisidine | 2.2 | 176–182 | |
| 2,4-dimethyl aniline, aniline | 1.1:1.1 | 95–99 | |
| 2,4-dimethyl aniline, para-toluidine | 1.1:1.1 | 90–140 | |
| Para-anisidine and aniline | 1.1:1.1 | 119–131 | 0.0003 |
| Para-anisidine and ortho-toluidine | 1.1:1.1 | 104–114 | 0.0007 |

From a consideration of the data presented in Table II it is apparent that alkylated diphenyl-para-phenylenediamines prepared from the indicated amine mixtures have much higher melting points and only a fraction of the solubility in n-pentane when compared to the compounds described in Table I. Furthermore, it is obvious from the data presented in Table II that merely preparing a diaryl para-phenylenediamine from a mixture of amines will not necessarily result in the production of a low melting compound.

The practical and economical advantage of employing alkyl-substituted diaryl para-phenylenediamines having melting points below 60 to 65° C. cannot be too strongly emphasized. The applicant has found that specific amine mixtures, when reacted with hydroquinone, alkyl substituted hydroquinones, or para-aminophenols, produce alkyl substituted diphenyl-para-phenylenediamines having unexpectedly low melting points and much improved solubility in aliphatic hydrocarbons and rubber and are thus surprisingly effective in the stabilization of rubber against attack by ozone and oxygen. Prior to the applicant's invention the alkyl substituted diaryl-para-phenylenediamines employed in the stabilization of rubber were so difficult to incorporate into rubber latices that they found only very limited commercial acceptance. In contrast, the low melting compounds of the present invention have within a relatively short period of time found a substantial degree of acceptance.

The usual procedure for incorporating an antiozonant or antioxidant in SBR synthetic rubber latices is by preparing an emulsion or dispersion of the compound in water. Neither of these methods can be successfully employed to incorporate the high melting diaryl-para-phenylenediamines which have been previously known. They cannot be successfully emulsified in water without employing organic solvents such as benzene, which leads to objections by polymer manufacturers. Attempts to employ conventional procedures for obtaining a fine solid dispersion in water, such as grinding the material in a ball mill, do not yield a stable dispersion. The high melting diaryl-para-phenylenediamines cannot even be successfully incorporated into conventional hydrocarbon oils used in preparing oil extended rubber without heating the oil to a temperature of 150° C. or more. In contrast to the above described difficulties encountered in using the previously known diaryl-para-phenylenediamines, the low melting compounds of the present invention are readily emulsified in water employing any of the conventional emulsifying agents and are thus readily and uniformally incorporated into synthetic rubber latices.

In the manufacture of stereospecific rubbers such as, for example, polyisoprene having essentially all of its units combined in a cis-1,4 structure, diaryl-para-phenylenediamines have been found to be quite effective as stabilizers. However, the previously known high melting compounds of this class have been very difficult to successfully incorporate into such rubbers. In the past it has been necessary to dissolve the high melting diaryl-para-phenylenediamines in an aromatic hydrocarbon such as benzene in order to get them into solution. When a portion of the master benzene solution of the stabilizer was added to the dilute cement of the stereospecific rubbers which are prepared in aliphatic hydrocarbons such as hexane, the high melting diaryl-para-phenylenediamines were thrown out of solution because of their very limited solubility in aliphatic hydrocarbons. Furthermore, the employment of aromatic solvents in the production of stereospecific rubbers presents a more difficult problem of solvent separation and recovery. The low melting compounds of this invention are much more soluble in aliphatic hydrocarbons than the previously known high melting compounds and thus the use of aromatic hydrocarbons can be avoided which, in turn, results in much more efficient and economical production of stereospecific rubbers.

The low melting alkylated diphenyl-para-phenylenediamines of this invention are prepared by reacting one mol of a compound selected from the group consisting of hydroquinone or ring alkylated hydroquinone with from 2.0 to 2.5 mols of specific aromatic amine mixtures. The reaction between hydroquinones and the amine mixture is conducted in the presence of any of the well known condensation catalysts such as metallic halides, phosphoric acid, sulfuric acid, toluene sulfonic acid, alkane sulfonic acid, ammonium chloride, etc. The temperature of the reaction will normally range from 175° C. to 325° C. with best results being obtained between 240 and 290° C.

It should be noted at this point that the methods of preparing the diaryl-para-phenylenediamines and, as a result, the reaction products as described in this application, differ greatly from those methods and reaction products described in the prior art such as those described by Albert M. Clifford in U.S. 2,087,199. The present procedures involve the continual removal of water as it is formed during the reaction. This is particularly significant since the presence of water lowers yields and changes the composition of the final product. The procedures described in U.S. 2,087,199 use approximately two times as much aromatic amine as was used in the present procedures. Reaction temperatures are from 40° C. to 70° C. less than those described in U.S. 2,087,199. This is significant since higher temperatures usually lead to tarry products, particularly in the presence of water. Reaction pressure is never in excess of 100 pounds per square inch. The reaction pressures obtained when Examples 1, 2 and 5 of U.S. 2,087,199 were repeated were 300, 650 and 875 pounds per square inch respectively. These differences result in reaction times which are shorter than the reaction times described in U.S. 2,087,199, the reaction times there being 40 to 80 percent longer. They also result in higher yields which in turn indicate higher purity products. The difference in the nature of the reaction products described in U.S. 2,087,199 is strongly pointed out by the fact that the three products prepared according to Examples 1, 2 and 5 of U.S. 2,087,199 were inferior in physical appearance to the materials prepared by present methods and also possessed poorer solubility in toluene than present reaction products. Three products prepared according to Examples 1, 2 and 5 of U.S. 2,087,199 were placed in toluene, 0.08 gram per 100 milliliters of solvent. For comparative purposes, products prepared by the method described in the present application were also placed in toluene to give the same solute-solvent concentration. The materials of the patent were only partially soluble while the materials prepared in accordance with the present application were completely soluble. Such differences as are described above are a strong indication of significantly different chemical reactions and resulting chemical compositions.

Another well known method of producing ring alkylated diphenyl-para-phenylenediamines is by reacting para-aminophenols with four or more mols of aromatic amine. When a para-amino-phenol and an alkylated aromatic amine mixture are heated in the presence of a catatlyst a two-stage reaction takes place. In the first stage a large excess of aromatic amine is used, the reaction is conducted at reflux temperature and ammonia is given off. In the second stage a higher temperature is used, which is usually obtained by removing some of the excess amine, or the reaction may be carried out under pressure in an autoclave. In this second stage water is formed which is continuously separated from the reaction mixture. Temperatures of the first stage are between 175° C. and 250° C. with 185° C. to 210° C. being preferred, depending on the nature of the amine mixture. In the second stage, temperatures are between 220° C. and 325° C. with 240° C. to 260° C. being preferred. Catalysts for both stages are the usual alkylation catalysts such as iodine, metallic halides, phosphoric acid, alkyl phosphates, aniline halides, ammonium halides, etc.

It will, of course, be understood that only two mols of the amine mixture will react with each mol of the hydroquinone or para-aminophenol, the excess amine beyond the two molar equivalents being employed to facilitate the reaction and to insure the formation of a high yield of diaryl-para-phenylenediamine. When the reaction is completed the excess amine is separated from the reactants by fractional distillation.

The rubbers which may be protected by the low melting alkylated diphenyl-para-phenylenediamines in accordance with this invention are natural rubber and those synthetic oxidizable rubbery polymers of conjugated dienes which are normally susceptible to deterioration by sunlight and atmospheric oxygen. By the term "oxidizable rubbery polymers of conjugated dienes" as employed in this application is meant natural rubber and the synthetic rubbery polymers and copolymers of conjugated dienes which are normally susceptible to deterioration by sunlight and atmospheric oxygen include polychloroprene; polyisoprene having essentially all of its units combined in a cis-1,4 structure; polybutadiene having essentially all of its units combined in a cis-1,4 structure; the rubbery copolymers of butadiene and styrene which may contain from 50 to 90 percent or more of butadiene; and butyl rubber which is a polymerization product of a major proportion of a mono olefin and a minor proportion of a multiolefin such as butadiene or isoprene.

The cis-1,4 polyisoprene rubber mentioned above may conveniently be produced in accordance with the procedures described in the following reference:

"Synthetic Natural Rubbers From Isoprene," Rubber and Plastic Age, Vol. 39, No. 11, page 938 (1958), by Mayor, Saltman and Pierson.

The cis-1,4 polybutadiene rubbers mentioned above may conveniently be produced in accordance with the procedures described in the following reference:

"New Controlled-Structure Polymer of Butadiene," Rubber and Plastic Age, March 1961, pages 276–282 by W. W. Crouch.

The products of this invention find their primary utility as age resistors for raw rubber in the latex form or coagulated polymers obtained from latices. They may be present in an amount from 0.25 to 8.0 percent by weight, based on the weight of the rubber, although it is generally preferred to use from 0.5 to 4.0 percent by weight, based on the weight of the rubber. In some instances it may be advantageous to add an additional amount of the age resistors of this invention to the raw polymers prior to vulcanization to obtain even greater antiozonant protection.

The following examples are presented as illustrations of the preparation of typical low melting alkylated diphenyl-para-phenylenediamines of this invention but they are not to be construed as limiting the scope of the invention.

Example 1

Three mols (330 grams) of hydroquinone were reacted in a suitable reaction flask with 3.5 mols (374 grams) of mixed toluidines and 3.5 mols (424 grams) of mixed xylidines. A small amount of toluene was employed to remove the water of condensation azeotropically. Fifteen grams of anhydrous ferric chloride were added to the reaction mixture as a condensation catalyst. The reaction flask was equipped with a reflux condenser and a water trap to remove $H_2O$ as fast as it was formed by the condensation of amines with the hydroquinone. The reaction was heated gradually to a temperature of 250° C. and maintained at this temperature for four hours. Upon completion of the reaction as indicated by the recovery of approximately 6 mols of water of condensation, the reactants were cooled and a saturated water-solution of $Na_2CO_3$ added to destroy the catalyst. The reaction mixture was then heated to 250° C. at 5 millimeters pressure to remove volatiles. The product was filtered while still hot to remove inorganic salts. A yield of 93.5 percent of alkylated diphenyl-para-phenylenediamines was obtained.

Example 2

One mol (110 grams) of hydroquinone was reacted in a suitable reaction flask with 1.1 mols (117 grams) of mixed toluidines and 1.1 mols (133 grams) of ortho-ethyl aniline. Toluene was employed as an azeotrope. Five grams of anhydrous ferric chloride was added to the reaction mixture as a condensation catalyst. The reaction was carried out employing essentially the same reaction conditions as described in Example 1 to obtain a yield of 93.7 percent of alkylated diphenyl-para-phenylenediamines.

Example 3

Seven mols (763 grams) of para-aminophenol were reacted in a suitable reaction vessel with 14 mols (1694 grams) of mixed xylidines and 14 mols (1498 grams) of mixed toluidines. One hundred and ten grams of anhydrous $FeCl_3$ were added to the reaction mixture as a condensation catalyst. Ammonia started coming off of the reactants at 180° C. Heating was continued for 20 hours at a temperature between 200 and 225° C. (A faster reaction could have been obtained in an autoclave where higher temperatures could have been used.) The reaction mixture was cooled to 100° C. and 150 grams of $Na_2CO_3$ as a 25 percent aqueous solution were added to destroy the catalyst. Water and other volatiles were removed by heating to 250° C. at 15 millimeters pressure. The product was filtered to remove inorganic salts. The final weight of product obtained was 2011 grams.

Example 4

Four mols (440 grams) of hydroquinone were reacted in an autoclave with 4.4 mols (471 grams) of mixed toluidines and 4.4 mols (532 grams) of mixed xylidines. Twenty grams of anhydrous ferric chloride and 100 grams of toluene were also added to the autoclave and the temperature raised to 250 to 260° C. After a short interval of time at this temperature the pressure built up to 100 pounds per square inch. At this point some of the gases were allowed to escape from the reactor where they were recovered and condensed. Water in the distillate was removed and the remaining mixture consisting of toluene and a mixture of toluidines and xylidines was recycled into the reaction. The recycling was carried on continuously until no further water of condensation was obtained. This required approximately three to five hours of reaction time. The reaction mixture was neutralized with a concentrated sodium carbonate solution and the volatile stripped off as described in Example 3. The final weight of product obtained was 1143 grams.

The following example illustrates the preparation of a stable emulsion of a low melting alkyl substituted diphenyl-para-phenylenediamine.

Example 5

Eighty grams of Dresinate TX (an alkali metal soap of processed resins) was dispersed in 160 grams of water and heated to 70° C. Five hundred grams of the low melting alkylated diphenyl-para-phenylenediamine prepared in Example 1 was heated to 90° C. and added slowly with vigorous stirring to the Dresinate TX solution; a water-in-oil emulsion resulted. To this water-in-oil emulsion was added 1260 grams of water with slow stirring to invert the emulsion to an oil-in-water emulsion which was readily compatible with rubber latices.

The incorporation of the stable oil-in-water emulsion prepared in Example 5 into a synthetic rubber latex is illustrated by the following example.

Example 6

Nine grams of the emulsion prepared in Example 5 which contained 25 percent of a low melting alkylated diphenyl-para-phenylene diamine was added to 770 milliliters of an SBR latex (1006) containing 25 percent solids. The two dispersions were thoroughly mixed and the rubber coagulated by the usual salt-acid process. Coagulation was complete at pH 5. The coagulated crumb was dried and the content of low melting alkylated diphenyl-para-phenylenediamine determined as 1.06 percent.

The incorporation of a low melting alkylated diphenyl-para-phenylenediamine in a cement of a stereospecific rubber is illustrated by the following example.

Example 7

A normal pentane solution was prepared of the low melting alkylated diphenyl-para-phenylenediamine produced in Example 1. A sufficient quantity of this antiozonant solution was added to a cement containing 16 percent of cis-1,4-polyisoprene in normal pentane to give an antiozonant content of 1.34 percent based on the weight of the rubber in the cement. The cis-1,4-polyisoprene rubber had essentially all of its units combined in a cis-1,4 structure. The polymer was dried and found to contain 1.28 percent of the low melting alkylated diphenyl-para-phenylenediamine. Microscopic examination showed that the antiozonant was well dispersed. After aging for four months the rubber sample showed no signs of antiozonant blooming.

The improved antiozonant efficiency of low melting alkylated diphenyl-para-phenylenediamine in accordance with the present invention was determined by conducting dilute solution viscosity (DSV) tests using natural rubber (pale crepe) as a base rubber in which to evaluate the various compounds. The DSV tests were carried out in accordance with the general procedure outlined in the article by Delman, Simms and Allison, Analytical Chemistry, vol. 26, pages 1589–1592 (1954). Essentially this procedure consisted of preparing a master batch solution of the base rubber in carbon tetrachloride. The solution was prepared to contain 0.8 gram of rubber per 100 milliliters of solution. Portions of this master batch solution were then diluted with additional carbon tetrachloride to obtain solutions containing 0.2 gram of rubber polymer per 100 milliliters of solution. The products which were evaluated for antiozonant activity were introduced to separate portions of the above described dilute solution in the proportion of four parts per 100 parts of rubber. A stream of ozonized oxygen was then passed through the dilute solutions and their viscosity determined at selected intervals using a Cannon-Fenske-Ostwald type viscometer. The antiozonant efficiency of the product evaluated was calculated by employing the following equation:

$$\text{Antiozonant efficiency percent} = \frac{100(B-A)}{(C-A)}$$

where
A = DSV of additive-free control after ozonolysis
B = DSV of additive-containing solutions after ozonolysis
C = initial DSV of additive-free control before ozonolysis The data obtained as summarized below in Table III.

TABLE III

| Sample | Compound | Antiozonant Efficiency | Percent Efficiency Based on Sample 1 |
|---|---|---|---|
| 1 | R.P.* hydroquinone and ortho-toluidine and aniline (1:1:1). | 20.1 | 100.0 |
| 2 | R.P.* hydroquinone and mixed toluidines and mixed xylidines (1:1.17:1.17) (Example 1). | 24.4 | 121.5 |

*R.P.—Reaction Product.

An examination of the data presented in Table III will show that Sample 2, which is an example of a low melting alkylated diphenyl-para-phenylenediamine according to the present invention, is more effective as an antiozonant than Sample 1 which is a typical high melting diaryl-para-phenylenediamine.

As previously mentioned, Examples 1, 2 and 5 of U.S. 2,087,199 were repeated. In Example 1 of U.S. 2,087,199 the maximum pressure reached was 300 pounds per square inch. The yield was 32.7 percent. The maximum pressure reached in Example 2 of U.S. 2,087,199 was 650 pounds per square inch. The yield was 84.6 percent. In Example 5 of U.S. 2,087,199 the maximum pressure was 875 pounds per square inch, while the yield was 85.9 percent. The antiozonant properties of these three reaction products were compared to the antiozonant properties of a product prepared by the method described in this application. The antiozonant properties were determined according to the DSV method previously described in this application with the exception that toluene was used as the solvent instead of carbon tetrachloride. The data are listed in Table IV.

TABLE IV

| Sample | Compound | Method of Preparation | Percent Efficiency Based on Sample 6 |
|---|---|---|---|
| 3 | R.P.* hydroquinone and aniline (1:4). | U.S. 2,087,199 (Example 1). | 59.8 |
| 4 | R.P.* hydroquinone and aniline (1:5). | U.S. 2,087,199 (Example 2). | 37.7 |
| 5 | R.P.* hydroquinone and mixed toluidines (1:4.44). | U.S. 2,087,199 (Example 5). | Negative |
| 6 | R.P.* hydroquinone and ortho-toluidine and aniline (1:1.12:1.12). | Present Method | 100 |

*R.P.—Reaction Product.

It is obvious from these data that the products prepared by the present method possess far superior antiozonant efficiency as compared to the products prepared according to the procedures described in U.S. 2,087,199. It should be noted that although the product prepared according to Example 5 of U.S. 2,087,199 was a liquid it possessed no antiozonant properties (note Table IV Sample 5). This shows that the mere fact that such a reaction product is a liquid is not an indication that it will also be a good antiozonant.

The antioxidant properties of these materials were measured by oxygen absorption tests. The oxygen absorption tests were conducted by dissolving in benzene portions of an SBR polymer (1006) containing 0.25 part per 100 parts of rubbery polymer of various antioxidant compositions of this invention. The cements so formed were poured onto aluminum foil so as to form a thin film. After drying the weight of rubber was obtained in connection with each sample. Thereafter the foil with the adhering rubber strip was placed in the oxygen absorption apparatus. The amount of oxygen absorbed in a particular interval of time was determined and recorded in the following table. This testing procedure is described in further detail in Industrial and Engineering Chemistry, Vol. 43, page 456 (1951) and Industrial and Engineering Chemistry, Vol. 45, page 392 (1953).

TABLE V

| Sample | Compound | Method of Preparation | Hrs. to 1% $O_2$ (90° C.) |
|---|---|---|---|
| 3 | R.P.* hydroquinone and aniline (1:4). | U.S. 2,087,199 (Example 1). | 295 |
| 4 | R.P.* hydroquinone and aniline (1:5). | U.S. 2,087,199 (Example 2). | 455 |
| 5 | R.P.* hydroquinone and mixed toluidines (1:4.44). | U.S. 2,087,199 (Example 5). | 313 |
| 6 | R.P.* hydroquinone and ortho-toluidine and aniline (1:1.12:1.12). | Present Method | 450 |
| 7 | R.P.* hydroquinone and mixed toluidines and mixed xylidines (1:1.12:1.12). | do | 418 |

*R.P.—Reaction Product.

An examination of the results shows two of the three materials (Samples 3 and 5) prepared according to Examples 1 and 5 of U.S. 2,087,199 to be inferior to both of the products prepared by the methods described in this application.

By referring to the data presented in Tables IV and V it will be apparent that Samples 3, 4 and 5 are relatively good antioxidants but quite inferior as antiozonants compared to the products of the present invention. The entire behavior of Samples 3, 4 and 5 indicate that higher condensates may have been formed. In general these higher condensates have poor solubility and would result in lower yields. They would be poor antiozonants but good antioxidants.

While certain representative embodiments and details have been shown for the purpose of illustrating the invention it will be apparent to those skilled in this art that various changes and modifications may be made therein without departing from the spirit or scope of the invention as defined in the appended claims.

What I claim is:

1. An oxidizable diene rubber having incorporated therein an antiozonant in the amount of from 0.25 to 8.0% by weight based on the weight of the rubber of a mixture of ring alkylated diphenyl-para-phenylene diamine prepared by reacting in the presence of a condensation catalyst at temperatures from 175 to 325° C., said reaction involving the continuous removal of water as it is formed, (a) a compound selected from the group consisting of hydroquinone and ring alkylated hydroquinones and (b) an amine mixture selected from the group consisting of (1) mixed xylidines
(2) mixed toluidines+mixed xylidines
(3) 2,4-dimethylaniline+ortho-toluidine
(4) mixed toluidines+mixed xylidines+aniline
(5) mixed xylidines+ortho-ethyl aniline
(6) ortho-ethyl aniline+aniline
(7) ortho-toluidine+ortho-ethyl aniline
(8) dodecyl aniline
(9) mixed toluidines+amyl aniline
(10) mixed toluidines+dodecyl aniline
(11) mixed toluidines+aniline+mixed xylidines
(12) mixed toluidines+aniline+2,6-diethyl aniline
(13) mixed toluidines+ortho-ethyl aniline
(14) mixed toluidines+2,6 - diethyl aniline+ortho - ethyl aniline
(15) mixed toluidines+amyl aniline+ortho-ethyl aniline
(16) mixed xylidine+aniline
(17) aniline+2,6-diethyl aniline+ortho-ethyl aniline
(18) mixed cumidines+mixed toluidines
(19) mixed cumidines the following proportions of said amine mixtures being reacted per mol of compound from group (a)

(1) 2.0 to 2.5 mols of mixed xylidines
(2) 1.0 to 1.25 mols of mixed toluidines+1.0 to 1.25 mols of mixed xylidines
(3) 1.0 to 1.25 mols of 2,4-dimethyl aniline+1.0 to 1.25 mols of ortho-toluidine
(4) 1.0 to 1.25 mols of mixed toluidine+0.7 to 1.0 mol of mixed xylidines+0.1 to 0.5 mol of aniline
(5) 1.0 to 1.25 mols of mixed xylidines+1.0 to 1.25 mols of ortho-ethyl aniline
(6) 1.0 to 1.25 mols of ortho-ethyl aniline+1.0 to 1.25 mols of aniline
(7) 1.0 to 1.25 mols of ortho toluidine+1.0 to 1.25 mols of ortho-ethyl aniline
(8) 2.0 to 2.5 mols of dodecyl aniline
(9) 1.0 to 1.25 mols of mixed toluidines+1.0 to 1.25 mols of amyl aniline
(10) 1.0 to 1.25 mols of mixed toluidines+1.0 to 1.25 mols of dodecyl aniline
(11) 1.0 to 1.25 mols of mixed toluidines+0.5 to 0.625 mol of aniline+0.5 to 0.625 mol of mixed xylidines
(12) 1.0 to 1.25 mols of mixed toluidines+0.5 to 0.625 mol of aniline+0.5 to 0.625 mol of 2,6-diethyl aniline
(13) 1.0 to 1.25 mols of mixed toluidines+1.0 to 1.25 mols of ortho-ethyl aniline
(14) 1.0 to 1.25 mols of mixed toluidines+0.5 to 0.625 mol of 2,6-diethyl aniline+0.5 to 0.625 mol of ortho-ethyl aniline
(15) 1.0 to 1.25 mols of mixed toluidines+0.5 to 0.625 mol of amyl aniline+0.5 to 0.625 mol of ortho-ethyl aniline
(16) 1.0 to 1.25 mols of mixed xylidines+1.0 to 1.25 mols of aniline
(17) 1.0 to 1.25 mols of aniline+0.5 to 0.625 mol of 2,6-diethyl aniline+0.5 to 0.625 mol of ortho-ethyl aniline

(18) 1.0 to 1.25 mols of mixed cumidines+1.0 to 1.25 mols of mixed toluidines
(19) 2.0 to 2.5 mols of mixed cumidines said ring alkylated diphenyl-para-phenylene diamines being further characterized in that they melt below 80° C. and conform to the following structural formula

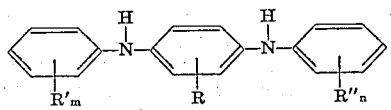

wherein R is selected from the group consisting of hydrogen and alkyl radicals having from 1 to 10 carbon atoms and wherein R' and R'' are selected from alkyl radicals having from 1 to 12 carbon atoms and wherein the sum of carbon atoms in R' and R'' is from 3 to 24 and wherein m and n are integers ranging from 0 to 3 and wherein the sum of m and n range from 1 to 4.

2. The oxidizable diene rubber according to claim 1 wherein the mixture of ring alkylated diphenyl-para-phenylene diamines is prepared by reacting (a) one mol of a compound selected from the group consisting of hydroquinone and ring alkylated hydroquinones and (b) an amine mixture composed of mixed toluidines and mixed xylidines, said amine mixture containing from 1.0 to 1.25 mols of mixed toluidines and from 1.0 to 1.25 mols of mixed xylidines per mol of compound from group (a).

3. The oxidizable diene rubber according to claim 1 wherein the mixture of ring alkylated diphenyl-para-phenylene diamines is prepared by reacting (a) one mol of a compound selected from the group consisting of hydroquinone and ring alkylated hydroquinones and (b) from 2.0 to 2.5 mols of mixed xylidines per mol of compound from group (a).

4. The oxidizable diene rubber according to claim 1 wherein the mixture of ring alkylated diphenyl-para-phenylene diamines is prepared by reacting (a) one mol of a compound selected from the group consisting of hydroquinone and ring alkylated hydroquinones and (b) an amine mixture composed of mixed toluidines, mixed xylidines and aniline, said amine mixture containing from 1.0 to 1.25 mols of mixed toluidines, from 0.7 to 1.0 mol of mixed xylidines and from 0.1 to 0.5 mol of aniline per mol of compound from group (a).

5. The oxidizable diene rubber according to claim 1 wherein the mixture of ring alkylated diphenyl-para-phenylene diamines is prepared by reacting (a) one mol of a compound selected from the group consisting of hydroquinone and ring alkylated hydroquinones and (b) from 2.0 to 2.5 mols of mixed cumidines per mol of compound from group (a).

6. An oxidizable diene rubber having incorporated therein an antiozonant in the amount of from 0.25 to 8.0% by weight based on the weight of the rubber of a mixture of ring alkylated diphenyl-para-phenylene diamines melting below 80° C. and prepared by reacting in the presence of a condensation cataylst, at temperatures from 175 to 325° C., said reaction involving the continuous removal of water as it is formed, hydroquinone and an amine mixture composed of mixed toluidines and mixed xylidines, said amine mixture containing from 1.0 to 1.25 mols of mixed toluidines and from 1.0 to 1.25 mols of mixed xylidines per mol of hydroquinone.

7. An oxidizable diene rubber having incorporated therein an antiozonant in the amount of from 0.25 to 8.0% by weight based on the weight of the rubber of a mixture of ring alkylated diphenyl-para-phenylene diamine prepared by reacting in the presence of a condensation catalyst at temperatures from 175 to 325° C., said reaction involving the continuous removal of water as it is formed, (a) a compound selected from the group consisting of para-aminophenol and ring alkylated para-aminophenols and (b) an amine mixture selected from the group consisting of (1) mixed xylidines
(2) mixed toluidines+mixed xylidines
(3) 2,4-dimethylaniline+ortho-toluidine
(4) mixed toluidines+mixed xylidines+aniline
(5) mixed xylidines+ortho-ethyl aniline
(6) ortho-ethyl aniline+aniline
(7) ortho-toluidine+ortho-ethyl aniline
(8) dodecyl aniline
(9) mixed toluidines+amyl aniline
(10) mixed toluidines+dodecyl aniline
(11) mixed toluidines+aniline+mixed xylidines
(12) mixed toluidines+aniline+2,6-diethyl aniline
(13) mixed toluidines+ortho-ethyl aniline
(14) mixed toluidines+2,6-diethyl aniline+ortho-ethyl aniline
(15) mixed toluidines+amyl aniline+ortho-ethyl aniline
(16) mixed xylidine+aniline
(17) aniline+2,6-diethyl aniline+ortho-ethyl
(18) mixed cumidines+mixed toluidines
(19) mixed cumidines the following proportions of said amine mixtures being reacted per one-half mol of compound from group (a)
(1) 2.0 to 2.5 mols of mixed xylidines
(2) 1.0 to 1.25 mols of mixed toluidines+1.0 to 1.25 mols of mixed xylidines
(3) 1.0 to 1.25 mols of 2,4-dimethyl aniline+1.0 to 1.25 mols of ortho-toluidine
(4) 1.0 to 1.25 mols of mixed toluidine+0.7 to 1.0 mol of mixed xylidines+0.1 to 0.5 mol of aniline
(5) 1.0 to 1.25 mols of mixed xylidines+1.0 to 1.25 mols of ortho-ethyl aniline
(6) 1.0 to 1.25 mols of ortho-ethyl aniline+1.0 to 1.25 mols of aniline
(7) 1.0 to 1.25 mols of ortho-toluidine+1.0 to 1.25 mols of ortho-ethyl aniline
(8) 2.0 to 2.5 mols of dodecyl aniline
(9) 1.0 to 1.25 mols of mixed toluidines+1.0 to 1.25 mols of amyl aniline
(10) 1.0 to 1.25 mols of mixed toluidines+1.0 to 1.25 mols of dodecyl aniline
(11) 1.0 to 1.25 mols of mixed toluidines+0.5 to 0.625 mol of aniline+0.5 to 0.625 mol of mixed xylidines
(12) 1.0 to 1.25 mols of mixed toluidines+0.5 to 0.625 mol of aniline+0.5 to 0.625 mol of 2,6-diethyl aniline
(13) 1.0 to 1.25 mols of mixed toluidines+1.0 to 1.25 mols of ortho-ethyl aniline
(14) 1.0 to 1.25 mols of mixed toluidines+0.5 to 0.625 mol of 2,6-diethyl aniline+0.5 to 0.625 mol of ortho-ethyl aniline
(15) 1.0 to 1.25 mols of mixed toluidines+0.5 to 0.625 mol of amyl aniline+0.5 to 0.625 mol of ortho-ethyl aniline
(16) 1.0 to 1.25 mols of mixed xylidines+1.0 to 1.25 mols of aniline
(17) 1.0 to 1.25 mols of aniline+0.5 to 0.625 mol of 2,6-diethyl aniline+0.5 to 0.625 mol of ortho-ethyl aniline
(18) 1.0 to 1.25 mols of mixed cumidines+1.0 to 1.25 mols of mixed toluidines
(19) 2.0 to 2.5 mols of mixed cumidines said ring alkylated diphenyl-para-phenylene diamines being further characterized in that they melt below 80° C. and conform to the following structural formula

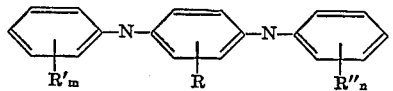

wherein R is selected from the group consisting of hydrogen and alkyl radicals having from 1 to 10 carbon atoms and wherein R' and R'' are selected from alkyl radicals having from 1 to 12 carbon atoms and wherein the sum of carbon atoms in R' and R'' is from 3 to 24 and wherein $m$ and $n$ are integers ranging from 0 to 3 and wherein the sum of $m$ and $n$ range from 1 to 4.

8. The oxidizable diene rubber according to claim 7 wherein the mixture of ring alkylated diphenyl-para-phenylene diamines is prepared by reacting (a) one mol of a compound selected from the group consisting of para-aminophenol and ring alkylated para-aminophenols and (b) an amine mixture composed of mixed toluidines and mixed xylidines, said amine mixture containing from 2.0 to 2.50 mols of mixed toluidines and from 2.0 to 2.50 mols of mixed xylidines per mol of compound from group (a).

9. The oxidizable diene rubber according to claim 7 wherein the mixture of ring alkylated diphenyl-para-phenylene-diamines is prepared by reacting (a) one mol of a compound selected from the group consisting of para-aminophenol and ring alkylated para-aminophenols and (b) from 4.0 to 5.0 mols of mixed xylidines per mol of compound from group (a).

10. The oxidizable diene rubber according to claim 7 wherein the mixture of ring alkylated diphenyl-para-phenylene-diamines is prepared by reacting (a) one mol of a compound selected from the group consisting of para-aminophenol and ring alkylated para-aminophenols and (b) an amine mixture composed of mixed toluidines, mixed xylidines and aniline, said amine mixture containing from 2.0 to 2.50 mols of mixed toluidines, from 1.4 to 2.0 mols of mixed xylidines and from 0.2 to 1.0 mol of aniline per mol of compound from group (a).

11. The oxidizable diene rubber according to claim 7 wherein the mixture of ring alkylated diphenyl-para-phenylene diamines is prepared by reacting (a) one mol of a compound selected from the group consisting of para-aminophenol and ring alkylated para-aminophenols and (b) from 4.0 to 5.0 mols of mixed cumidines per mol of compound from group (a).

12. An oxidizable diene rubber having incorporated therein an antiozonant in the amount of from 0.25 to 8.0% by weight based on the weight of the rubber of a mixture of ring alkylated diphenyl-para-phenylene diamines melting below 80° C. and prepared by reacting in the presence of a condensation catalyst, at temperatures from 175 to 325° C., said reaction involving the continuous removal of water as it is formed, para-aminophenol and an amine mixture composed of mixed toluidines and mixed xylidines, said amine mixture containing from 2.0 to 2.50 mols of mixed toluidines and from 2.0 to 2.50 mols of mixed xylidines per mol of para-aminophenol.

References Cited

UNITED STATES PATENTS

| | | | |
|---|---|---|---|
| 1,980,102 | 11/1934 | Semon | 260—45.9 |
| 2,048,823 | 7/1936 | Semon | 260—45.9 |
| 2,053,785 | 9/1936 | Semon | 260—45.9 |
| 2,087,199 | 7/1937 | Clifford | 260—45.9 |
| 2,238,320 | 4/1941 | Hardman | 260—45.9 |
| 2,503,712 | 4/1950 | Clemens et al. | 260—45.9 |
| 2,645,674 | 7/1953 | Kinney | 260—45.9 |
| 2,941,979 | 6/1960 | Pohle et al. | 260—45.9 |

DONALD E. CZAJA, *Primary Examiner.*

H. E. TAYLOR, JR., *Assistant Examiner.*

U.S. Cl. X.R.

252—401; 260—292, 577, 801, 805, 809, 814